Dec. 6, 1927.

W. F. HODGES 1,651,891

METHOD OF TREATING FERROUS METAL

Filed April 26, 1924

Inventor:
William F. Hodges
His Attorney.

Patented Dec. 6, 1927.

1,651,891

UNITED STATES PATENT OFFICE.

WILLIAM F. HODGES, OF SCHENECTADY, NEW YORK, ASSIGNOR TO GENERAL ELECTRIC COMPANY, A CORPORATION OF NEW YORK.

METHOD OF TREATING FERROUS METAL.

Application filed April 26, 1924. Serial No. 709,304.

The present invention comprises a method of preventing the decarbonization of steel, or other ferrous metal containing substantial amounts of carbon, by the action of a reducing gas, such as hydrogen, which may be introduced into contact with the ferrous metal to prevent oxidation, or to facilitate brazing or other metallurgical operations.

My invention is particularly applicable to the heat treating or brazing of carbon steel in contact with a decarbonizing agent. At an elevated temperature hydrogen removes carbon from the steel and softens it. First a surface layer becomes decarbonized and softened and in time the entire mass becomes decarbonized.

In accordance with my invention this undesired decarbonizing effect is avoided by coating the surface of the carbon-containing metal prior to heating in contact with the decarbonizing gas, with a cuprous metal, preferably with copper.

Figure 1:
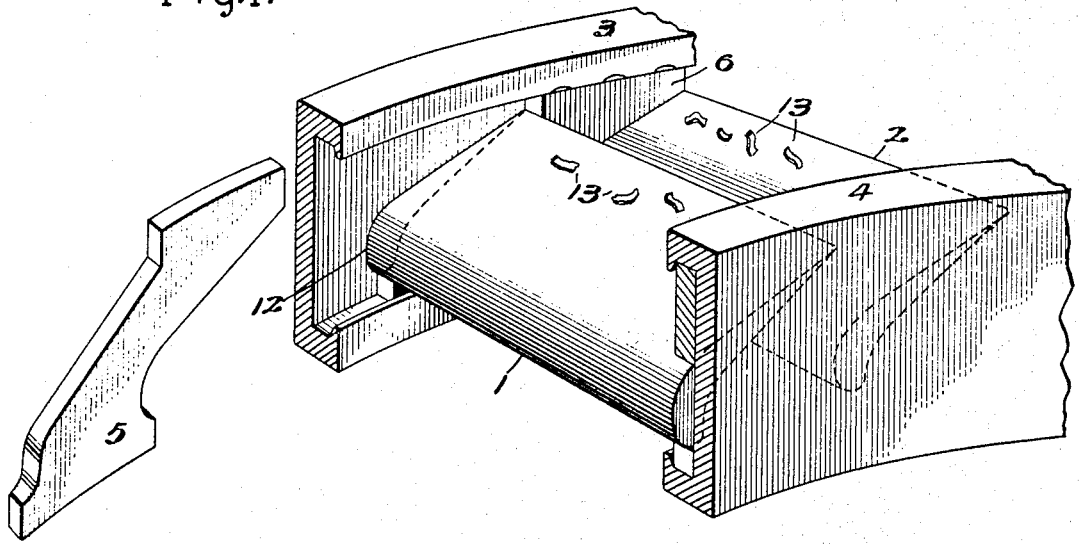
Figure 2:
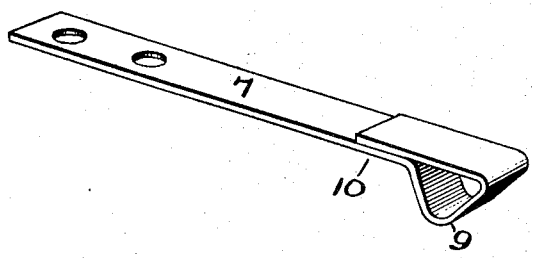

The accompanying drawing illustrates in perspective in Figs. 1 and 2 articles produced by the practice of my invention.

The article shown in Fig. 1 is a segment of an annular turbine member which contains wedge-shaped nozzle partitions 1, 2 which are tapered to a sharp edge as shown. These partitions are fastened into holders 3, 4 by a brazing operation carried out in hydrogen. For example, these partitions are assembled in the holders 3, 4 together with spacing members which fit into the grooves of the holders 3, 4 and closely surround the ends of the partitions 1, 2. One of these spacing members (bearing numeral 5) is shown in perspective. Formerly these spacers were driven firmly into place, as indicated at 6, and the assembled unit was brazed in hydrogen by copper placed conveniently along the outer boundaries of the joints and heated to the melting point. In hydrogen the molten copper is extremely mobile and hence penetrates the minute crevices between the assembled parts.

As already indicated, a surface layer of the steel parts becomes decarbonized and softened which is particularly disadvantageous along the thin edges as here the metal becomes decarbonized throughout and hence soon breaks or bends in service. Partitions for turbine nozzles ordinarily contain about 0.35 to 0.45 percent carbon but, of course, the specific carbon content is of no especial significance.

The same difficulty of decarbonization is encountered in the manufacture of contact fingers such as used in electric switching apparatus, and consisting of steel containing about one percent of carbon. As shown in Fig. 2, a finger is formed by bending the end of a strip 7 of steel while in an annealed condition to form a contact tip 9. The bent-over end of the tip preferably should be brazed at 10 to the main part of the strip. If this brazing operation were carried out in hydrogen causing fluid copper to unite the opposing surfaces, a strong union is produced but, as above stated, the steel is decarbonized by the highly heated hydrogen, rendering it impossible to secure the desirable hardness and springiness in the contact finger by subsequent heat treatment.

In accordance with my invention this undesired decarbonization is prevented by coating the entire object in which a carbon content is to be preserved with copper, or a cuprous alloy. Conveniently this coating operation is carried out by electrolysis although other methods may be used. For example, in the case of articles of simple shape, such as a rod, a copper shell may be fitted mechanically upon the steel, but in order to get maximum protection, a fitted jacket should be heated rapidly to the melting temperature. Brass, or other copper alloy, may be used as the coating material, but in this case, also, the temperature should be rather quickly carried to the melting point of copper. Zinc is volatilized at an elevated temperature, leaving the copper in a porous condition, permeable to hydrogen. However, even though some carbon is removed from the surface, while the copper is in this permeable condition, it is later restored, when the copper has been melted, by diffusion from the interior parts of the mass without greatly impairing the quality of the metal. The copper plating need only be very thin, say 0.001" or more, depending on conditions.

The brazing operation is carried out in the usual way. In the case of the article shown in Fig. 1, copper to act as brazing metal is placed along the joints as at 12. Some copper chips, preferably, are placed on the plated surface of the partitions 1 and 2 as indicated at 13. In the case of the finger the braze at 10 is formed by metal supplied by the copper coating or a thin plate of copper may be inserted between the surfaces to be joined.

Even when the parts are heated to as high a temperature as 1150° to 1200° C. for as long as thirty minutes, the carbon content is not removed by the hydrogen. Ordinarily the heating is continued only just long enough to melt the copper.

It is surprising to find that copper will prevent the decarbonizing effect of hydrogen, as copper, when heated in the presence of hydrogen, becomes deoxidized. Copper, therefore, appears to be penetrable by hydrogen. My best explanation of the phenomenon is that copper prevents the migration of carbon to the surface where the hydrogen is most active. It is also probable that any hydrocarbons which may be formed by interaction of carbon with hydrogen are prevented from escaping from the metal by the copper which seals the surface of the steel.

After the brazing operation the brazed joint may be hardened by quenching, thereupon the articles may be tempered by reheating by the well established practice.

The benefit of my invention may be secured when high carbon steel is to be heat treated for purposes other than brazing; for example, carbon steel articles advantageously may be machined accurately to desired size, then copper coated and heated under the protection of hydrogen to the recalescence temperature, which varies with the composition of the steel, say from about 750° to 850° C. Thereupon the steel is quenched and tempered as usual. In this way the oxidation and scaling formerly encountered when heating it are avoided without loss of carbon content.

What I claim as new and desire to secure by Letters Patent of the United States is:—

1. The method of preventing the decarbonization of iron containing substantial amounts of carbon during heating in contact with a decarbonizing gas which consists in sealing the surface of said iron with a cuprous metal.

2. The method of preventing the decarbonization of carbon steel during heating in contact with hydrogen which consists in sealing the surface of said steel with copper.

3. The method of preventing the decarbonization of steel by hydrogen at an elevated temperature which consists in coating said steel with copper preliminary to heating in contact with hydrogen.

4. The step in the process of uniting ferrous metal members by fused copper in the presence of hydrogen which consists in protecting the surface of said metal outside of the area to be brazed by applying a coating of copper to said surface preliminary to the brazing operation.

5. The method of preventing the decarbonization of iron containing substantial amounts of carbon when brazing the same by fused metal in a reducing gas which has a decarbonizing effect which consists in sealing the surface of said iron with a cuprous metal before the brazing operation is carried out.

6. The process of joining metal members at least one of which consists of carbon steel which consists in plating said carbon steel members with copper and thereupon bringing the members to be joined into contact with each other and with fused copper in a hydrogen atmosphere, thereby producing a bond, the surface outside of the bond being protected from decarbonization by the copper coating.

7. The method of preventing the removal of carbon from ferrous metal when said metal is heated in contact with a decarbonizing gas, which consists in sealing the surface of said metal with a cuprous metal.

In witness whereof, I have hereunto set my hand this 25th day of April, 1924.

WILLIAM F. HODGES.